W. H. McSWAIN.
APPARATUS FOR THE MANUFACTURE OF GLASSWARE.
APPLICATION FILED NOV. 29, 1919.
1,384,967.
Patented July 19, 1921.
3 SHEETS—SHEET 2.
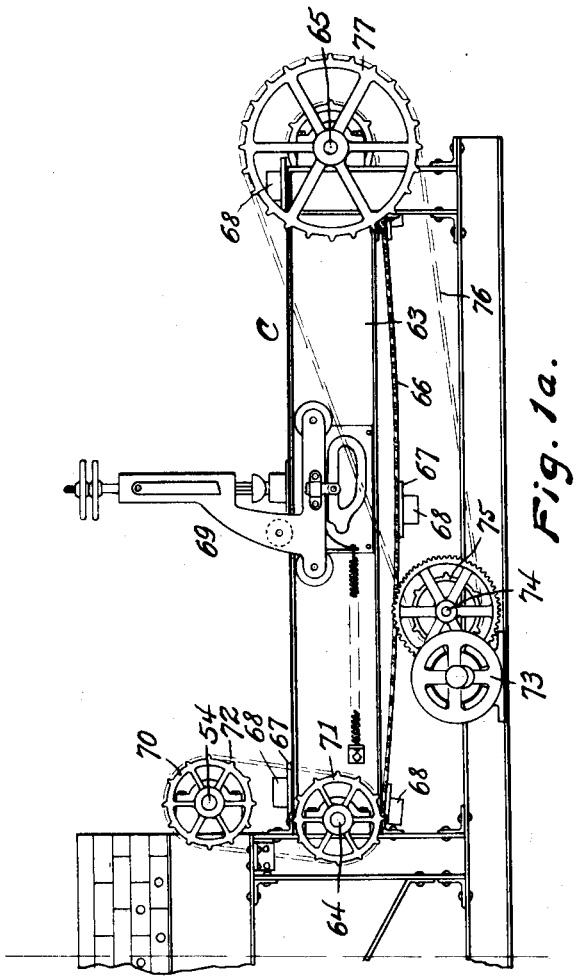
INVENTOR.
W. H. McSwain.
By H. E. Dunlap,
ATTORNEY.

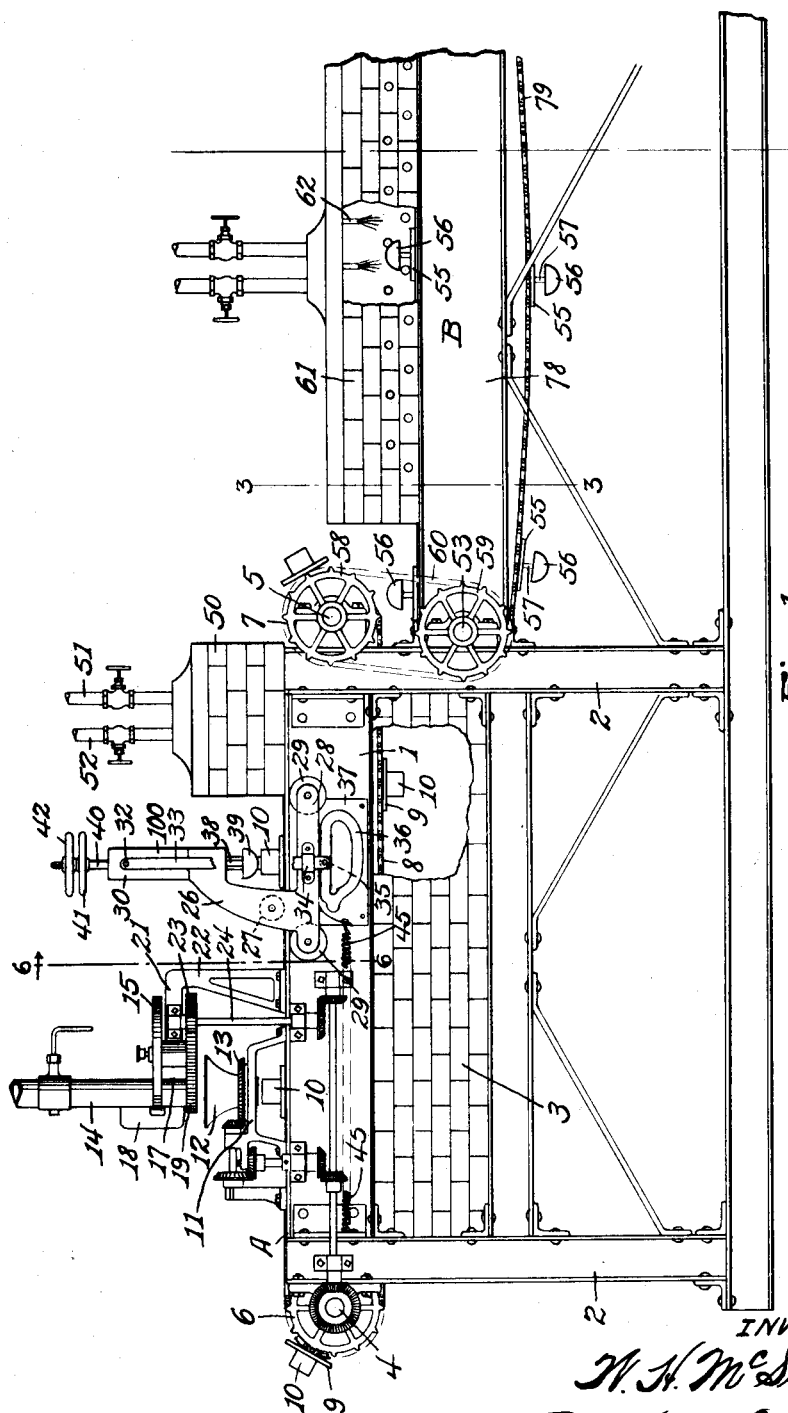

W. H. McSWAIN.
APPARATUS FOR THE MANUFACTURE OF GLASSWARE.
APPLICATION FILED NOV. 29, 1919.

1,384,967.

Patented July 19, 1921.

INVENTOR.
W. H. McSwain.
By N. E. Dunlap
ATTORNEY.

UNITED STATES PATENT OFFICE.

WILLIAM H. McSWAIN, OF MOUNDSVILLE, WEST VIRGINIA.

APPARATUS FOR THE MANUFACTURE OF GLASSWARE.

1,384,967.   Specification of Letters Patent.   Patented July 19, 1921.

Application filed November 29, 1919. Serial No. 341,506.

*To all whom it may concern:*

Be it known that I, WILLIAM H. McSWAIN, a citizen of the United States of America, and resident of Moundsville, county of Marshall, and State of West Virginia, have invented certain new and useful Improvements in Apparatus for the Manufacture of Glassware, of which the following is a specification.

This invention relates broadly to glass making apparatus, and more particularly to a machine for the automatic manufacture of pressed articles of glassware.

The primary object of the invention is to provide a machine designed for automatically performing all of the various operations required in the manufacture of pressed articles of glassware from the flowing of the glass from the melting tank or pot to the production of the finished articles.

A further object is to provide a machine of simple and comparatively inexpensive construction adapted for the continuous and rapid handling of the glass in an efficient and economical manner without human intervention.

With these and other important objects in view, the invention resides in the features of construction, arrangement of parts and combinations of elements which will hereinafter be exemplified, reference being had to the accompanying drawings, in which—

Figures 1 and 1ª together illustrate a side elevation of the machine, parts of the structure being broken away;

Referring to said drawings, in which like designating characters distinguish like parts throughout the several views—

Figure 2:
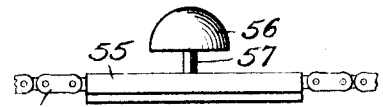
Fig. 2 is an enlarged side elevation of a ware carrier.
Figure 3:
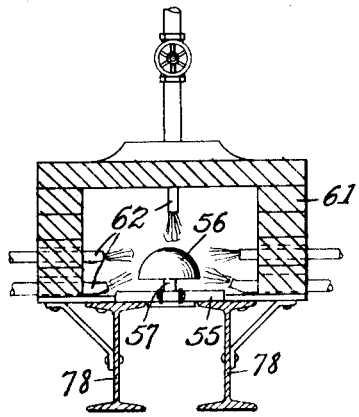
Fig. 3 is a transverse section on line 3—3, Fig. 1.

1 indicates a pair of parallel longitudinally disposed frame members, preferably of I-beam form, which constitute a platform designated generally by the letter A, said members being carried by suitable supports, as 2. Said platform overlies the opposite side walls of a heating oven 3. Journaled at or adjacent to the rear and front ends, respectively, of said platform are transverse shafts 4 and 5 having fixed thereon sprocket wheels 6 and 7 which carry one or more endless sprocket chains 8.

Carried by said chain or chains 8 at regularly spaced intervals are the base portions 9 of a plurality of open-mouthed press molds 10, those herein shown for illustrative purposes having approximately the form of those employed in making a common shape of nappy. The opposite lateral edge portions of the bases 9 carried by the upper laps or passes of said chains travel along a truly horizontal path, as upon the upper surfaces of the frame members of the platform A, so that said molds 10 are maintained at a uniform level throughout that portion of their travel in which they move in a forward direction.

Mounted upon the platform adjacent to the rear end thereof is a supporting stand 11 beneath which said molds travel, and mounted on said stand and having its lower end projecting downward therethrough is a constantly rotated funnel-like receptacle 12 within which a quota of glass for each of said molds is deposited at regularly timed intervals. Rotation is communicated to the funnel 12 in any appropriate manner, as through suitable transmission gearing arranged between the shaft 4 and a gear wheel 13 fixed in encircling relation to said funnel, the purpose of such rotation being to prevent the charge of molten glass delivered thereto from adhering to its walls and to insure the ready passage of such charges therethrough so that they will be delivered to the molds 10 at the proper moments.

The mechanism by which charges containing the proper quota of molten glass are furnished comprises a spout 14 of appropriate material leading from a glass melting tank or pot (not shown) through which the glass drains by gravity. Operating in closely underlying relation to the discharge end of said spout is the peripheral edge portion of a horizontally disposed rotating disk 15 which has provided in said edge portion a plurality of regularly spaced apertures 16 adapted to be carried successively into registering relation to said discharge end for permitting a quantity of the molten glass to flow therethrough to a measuring receptacle or cup 17 which is supported stationarily in closely underlying relation to said disk 15, as by a yoke member 18 carried by said spout. Said cup 17 is open at both ends and has its lower end closely overlying the peripheral edge portion of the face of a disk-like gear wheel 19 which is located parallel to said disk 15 and is rigidly connected to the latter by an axially disposed spindle 20. Said spindle rotates within a bearing carried by the inner end of an arm 21 formed upon a suitably mounted supporting bracket 22. Rotation is communicated to said gear wheel 19 and, consequently, to the disk 15, by a pinion 23 disposed in mesh with said gear wheel, said pinion being carried by an upright shaft 24 which is driven in a suitable manner, as by gearing interposed between it and the constantly rotated shaft 4.

The gear wheel 19 has in its edge portion a plurality of regularly spaced apertures 25 corresponding to, but out of register with, the apertures 16 in the disk 15, said apertures 25 being adapted to be carried successively into registering relation to the bottom opening of the cup 17 to permit the charges of glass carried by the latter to drop therethrough to the directly underlying funnel 12.

As is obvious, the disk 15 serves as a cutter which coöperates with the discharge end of the spout 14 for effecting the shearing of the charges of glass which flow through the apertures 16 to the measuring cup 17; and the gear wheel 19 serves as a support for the sheared off charges of glass until the latter gravitate through the apertures 25 thereof.

Figure 6:
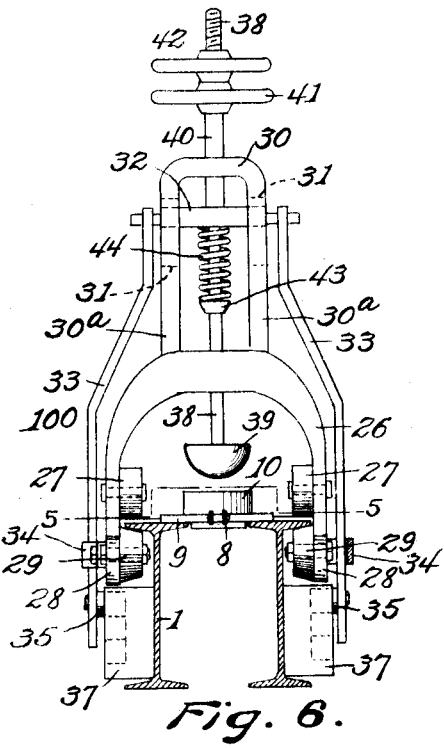
Fig. 6 is a sectional elevation on line 6—6, Fig. 1.
Figure 8:
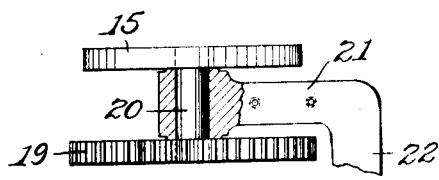
Fig. 8 is a side elevation of the same.

Located in front of, and normally occupying a position adjacent to the position of the supporting bracket 22 is a press 100 by means of which the charges of glass delivered to the traveling molds 10 are pressed into desired shape within the latter. Said press comprises a yoke-shaped frame member 26 disposed in straddling relation to the trackway constituted by the frame members 1 and carrying rollers 27 which are disposed for travel upon the top surfaces of the head portions of said members 1. Carried by, or formed integral with, the lower portion of each of the parallel members of the yoke 26 is a longitudinally extending arm 28 which carries at its opposite ends rollers 29 which underlie the head portions of said members 1, as shown in Figs. 1 and 6, for preventing overturning movement of the press.

Carried upon the top of, or forming a part of the yoke 26 is a support 30 comprising upright members 30$^a$ having therein vertical slots 31 in which are disposed the opposite end portions of a vertically movable crosshead 32. Attached to the ends of said crosshead are the upper ends of approximately upright bars 33 which pass through keepers 34 mounted on the outer sides of the arms 28 and which carry upon their lower ends anti-friction rollers 35 disposed for travel in a channel-like trackway or camway 36 provided in the outer faces of blocks 37 which are stationarily mounted laterally of the platform A, as upon the frame members 1.

Extending loosely through the central part of the crosshead 32 is a vertically movable stem 38 which carries a plunger-like former 39 adapted to be depressed within the molds 10 for shaping the charge of molten glass to form an article of ware. Said stem has its upper end portion extended through a tubular sleeve 40 which has its lower end permanently seated upon said crosshead, and threaded upon the projecting upper end of said stem into pressure-exerting relation to the adjacent end of said sleeve is a suitable form of adjusting device, as the wheel 41, which may have a second wheel 42 threaded therebehind for locking it in adjusted position. Said stem carries thereon at an appropriate point a collar 43 upon which is seated the lower end of a spiral compression spring 44 that has its upper end resting against the under side of said crosshead.

Figure 4:
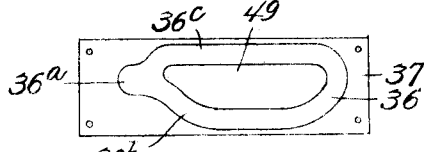
Fig. 4 is an enlarged side elevation of a runway block.

The trackway 36 is of oblong oval, or cam-like, form, as shown in Figs. 1 and 4. A retractile spring 45 attached at its front end to a suitable part of the press 100 hereinbefore described normally holds said press in a retracted position in which the rollers 35 are disposed at the rearmost part of said camway 36, indicated at 36$^a$, for supporting the crosshead 32 and former 39 in their elevated positions, as depicted in Fig. 6. As each mold 10, in traveling forward, assumes a position in vertical alinement with said former 39, its base 9 engages claws 46$^a$ formed on the front ends of a pair of oppositely disposed forwardly extending hooks 46 which are pivotally attached to the inner sides of the side members of the yoke 26. Having so engaged said hooks 46, the entire press is drawn forward with said mold against the tension of the spring 45 throughout a distance necessary to effect the reciprocation of the former, whereupon said hooks 46 are actuated to release their hold on the mold base 9 and, actuated by said spring 45, the press is returned to its normal position.

Figure 5:
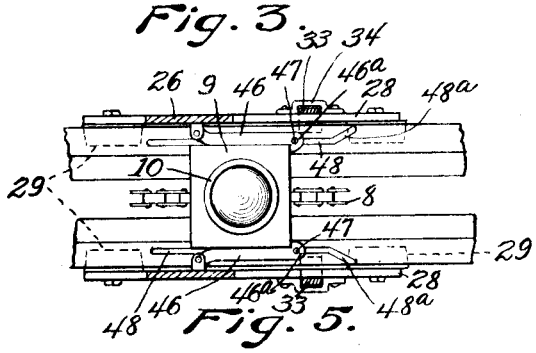
Fig. 5 is a horizontal sectional view showing the mechanism by which each of the presses is advanced, said section being taken substantially on the line 5—5, Fig. 6.
Figure 7:
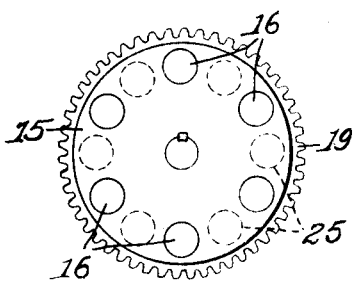
Fig. 7 is a top plan view of the cut-off device for the charge of glass; and—

Each of the hooks 46 has a vertical pin 47 which is fixed in the claw-like ends 46$^a$ thereof disposed for travel in a longitudinal channel 48 provided in the upper face of the adjacent frame member 1. In the normal position of the press the pins 47 are disposed in the rear ends of said channels 48; and, during forward travel of the press said pins move forward along said channels, maintaining the claws of said hooks in inwardly-thrust positions in which they are interlocked with the mold base 9. Said channels have their front end portions inclined laterally in outward directions, as shown at 48ᵃ in Fig. 5, so that, through the intermediacy of the pins traveling therein, the hooks will be gradually withdrawn from interlocking relation to the mold-base 9 for releasing the press at an appropriate point in the forward travel of the latter.

The reciprocation of the plunger is effected by the travel of the rollers 35 throughout the camway 36 which is so shaped that said rollers are first caused to travel in a forwardly and downwardly inclined direction for gradually drawing the bars 33 downward. With downward movement of said bars, the crosshead 32 is drawn downward in the slot-like slideways 31 for depressing the former 39 which, at the lowermost part of the travel of said rollers 35, is seated within the underlying mold 10, displacing by pressure the glass of the therein-carried charge to the extent that an article of glassware having the required shape is produced. Due to the provision of the spring 44, a yielding pressure is exerted by the former 39 within the mold, said pressure being gradually increased following the seating of said former and then gradually decreased prior to withdrawal of said former. Thus, the glass of the charge is not subjected to an objectionable sudden and unyielding force such as would result from the employment of a rigidly carried former.

The camway 36 has its rearmost part 36ᵃ, in which the rollers 35 are normally disposed, located on a level somewhat below that occupied by the rear end of the cam 49 which is circumscribed by said camway, so that, when the press is actuated to advance in the manner hereinbefore described, said rollers will enter the downwardly and forwardly inclined rear end of the lower portion 36ᵇ of the camway. Said camway has a longitudinal length corresponding to that throughout which the press is caused to travel prior to its release from interlocking relation with the traveling molds 10, and the contour of the lower portion 36ᵇ of said camway is such that the former 39 is actuated downward into coöperative relation to said mold and is returned to or adjacent to its normal elevated position prior to reaching the extreme front end of said camway, at which point the press is released. The upper, or return, portion 36ᶜ of the camway, which is traversed by said rollers 35 in the return movement of the press actuated by the spring 45, is inclined first upward and rearward to a level above that of the portion 36ᵃ, and at its rear end is inclined downward to said portion 36ᵃ, as shown.

Located over the platform A directly in front of the foremost position assumed by the press in the forward travel of the latter is a furnace 50 of suitable length through which the shaped articles of ware carried by the molds 10 are carried and in which said articles are exposed to the action of jets of flame issuing from a plurality of suitably arranged blast nozzles or burners (not shown) to which gas and air for supporting combustion are conducted in an appropriate manner, as by pipes 51 and 52. Said jets of flame and the heat created thereby act upon the interiors of said articles of ware for producing an internal glaze.

The under or return laps or passes of the sprocket chains 8 preferably pass through the heating oven 3 which underlies the platform, as aforesaid, and which is heated in any suitable manner, said oven being designed to heat the returning molds 10 carried by said chains to the extent required to maintain them in proper condition.

Located in front of the platform A is a second platform B constituted by suitably supported parallel I-beams 78, said platform B being disposed in a horizontal plane located a suitable distance below that of the platform A. Journaled at opposite ends of said platform B are shafts 53 and 54 having fixed thereon sprocket wheels which carry endless sprocket chains 79; and mounted upon said chains at regularly spaced distances corresponding to those between the molds 10 are the bases 55 of a plurality of ware-carriers 56 which surmount upright stems 57 fixed upon said bases. Said carriers have a form and size approximating that of the former 39 and, consequently, substantially corresponds to the internal contour of the articles of ware formed in the molds 10 as aforesaid. The rate of travel of the chains 79 corresponds to that of the chains 8, the shafts 5 and 53, respectively, carrying sprocket wheels 58 and 59 of equal diameters which are connected by a sprocket chain 60 through which power is communicated for driving one of said sets of chains, as will hereinafter be explained.

As each mold 10 is carried over the shaft 5 to a reversed position, the article of ware carried thereby drops therefrom to a ware-carrier 56 which is then disposed in position to receive said article, the relative arrangement of the molds 10 and ware-carriers 56 being such that they synchronously assume discharging and receiving positions, respectively. The articles of ware received by said ware carries are promptly carried forward into a furnace 61 of suitable length which is superposed upon or over the platform B. In the passage of the articles of ware through said furnace, the exterior surfaces thereof are subjected to the glazing action of heat and flame from a plurality of suitably arranged blast nozzles or burners 62 to which gas and air for supporting combustion are conducted in any appropriate manner.

Located in front of and on a lower plane than said platform B is a third platform C similar to platform A and including parallel I-beams 63. Journaled at the rear and front ends, respectively, of said platform C are shafts 64 and 65 having fixed thereon sprocket wheels which carry endless sprocket chains 66; and mounted on said chains at regularly spaced distances corresponding to those between the ware-carriers 56 are the bases 67 of a plurality of molds 68 having a form and size corresponding precisely to said molds 10, said molds 68 being designed as finishing molds in which the ware is repressed and finished by means of a press 69 which is superposed over said platform C and which corresponds in all respects with the press 100 hereinbefore described. The rate of travel of the chains 66 corresponds to that of the chains 79, the shafts 54 and 64 respectively carrying sprocket wheels 70 and 71 of equal diameters which are connected by a sprocket chain 72 through which power is communicated, as will hereinafter be explained.

As each ware-carrier 56 is carried over the shaft 54 to a reversed position, the article of ware carried thereby drops therefrom to a mold 68 which is then disposed in position to receive said article, the relative arrangement of the ware carriers 56 and molds 68 being such that they synchronously assume discharging and receiving position, respectively.

While power may be transmittted in any of numerous ways for driving the mechanisms hereinbefore described, I prefer that herein illustrated, the same comprising an electric motor 73 suitably geared for driving a shaft 74 located under the platform C and carrying a sprocket wheel 75 connected by a chain 76 to a sprocket wheel 77 fixed on the shaft 65. Power is thence communicated successively to and through chains 66, shaft 64, chain 72, shaft 54, chains 79, shaft 53, chain 60, shaft 5, chains 8 and shaft 4.

What is claimed is—

1. In apparatus for the manufacture of glassware, a plurality of traveling molds, a press embodying a former, automatic means whereby said press is interlocked with each mold when the latter assumes a position in operative relation to said former, said means being adapted to maintain said relation during a definite portion of the travel of said mold, means actuated by forward travel of said press whereby said former is reciprocated with respect to said mold, and means for returning said press to its normal position.

2. In apparatus for the manufacture of glassware, a plurality of traveling molds, a press adapted to coöperate successively with said molds, means whereby said press is interlocked with each mold when the latter assumes operative relation thereto and whereby said press is advanced with said mold throughout a part of the travel of the latter, and means whereby the plunger of said press is reciprocated during the advancing movement.

3. In apparatus for the manufacture of glassware, a stationary platform, an endless carrier, a plurality of molds carried by said carrier at regular intervals, a press adapted to coöperate successively with said molds, said press being disposed for travel upon said platform, means whereby said press is interlocked with each mold and is actuated to travel with the latter throughout a definite distance, means whereby the plunger of said press is reciprocated with respect to said mold during its said travel, and means for returning said press to normal position.

4. In apparatus for the manufacture of glassware, a stationary platform, an endless carrier, a plurality of molds carried by said carrier at regular intervals, a press adapted to coöperate successively with said molds, said press being disposed for travel upon said platform, means whereby said press is interlocked with each mold and is actuated to travel with the latter throughout a definite distance, camways formed laterally of said platform, and means engaged with said camways and traveling therein during forward travel of the press whereby the plunger of the latter is reciprocated with respect to the engaged mold during said travel.

5. In apparatus for the manufacture of glassware, a platform, an endless carrier disposed for continuous travel over said platform, a plurality of molds carried by said carrier at regular intervals, a press located over the path of travel of said molds, means whereby said press is successively interlocked with said molds and is actuated to travel forward with the latter throughout a definite distance, means actuated by forward travel of the press whereby the plunger of the latter is reciprocated with respect to the engaged mold during said forward travel, and means for returning said press to its normal position following reciprocation.

6. In apparatus for the manufacture of glassware, a platform, an endless carrier disposed for continuous travel over said platform, a plurality of molds carried by said carrier at regular intervals, a press located over the path of travel of said molds, means whereby said press is successively interlocked with said molds and is actuated to travel forward with the latter throughout a definite distance, a plunger carried by the press, camways formed on said platform, means disposed for travel in said camways, and means intermediate said traveling means and said plunger whereby the latter is reciprocated with respect to the engaged mold during the forward travel of said press.

7. An apparatus for the the manufacture of pressed articles of glassware, comprising a platform, an endless carrier arranged for continuous travel over said platform, a plurality of molds borne by said carrier at regular intervals, a press disposed over the path of travel of said molds, said press being arranged to advance successively with said molds throughout a definite distance, means actuated during forward travel of said press for reciprocating the plunger of the latter with respect to an underlying mold for shaping the ware, and a glazing oven through which said molds travel following the ware-shaping operation.

8. An apparatus for the manufacture of pressed articles of glassware, comprising a platform, an endless carrier arranged for continuous travel over said platform, a plurality of molds borne by said carrier at regular intervals, a press disposed over the path of travel of said molds, said press being arranged to advance successively with said molds throughout a definite distance, means actuated during forward travel of said press for reciprocating the plunger of the latter with respect to an underlying mold for shaping the ware, an oven located in front of the foremost position assumed by said press and through which the articles of ware are carried for receiving an internal glaze, a furnace located in front of and on a lower level than said oven, and ware-carriers traveling through said furnace, said ware-carriers being arranged to receive from said molds articles of ware carried by the latter and to present the same within said furnace for receiving an external glaze.

In testimony whereof I affix my signature.

WILLIAM H. McSWAIN.